United States Patent Office 3,092,224
Patented June 4, 1963

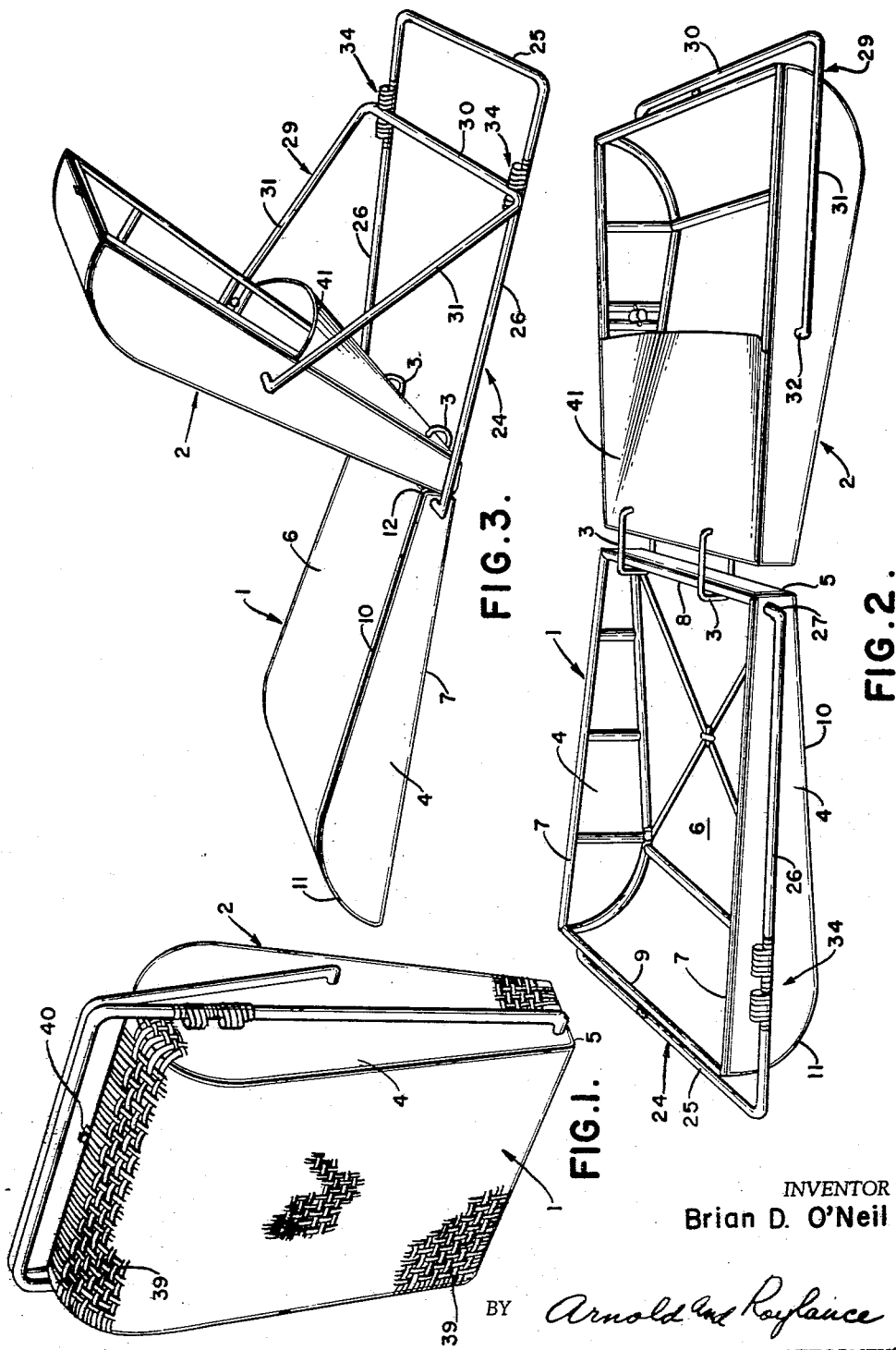

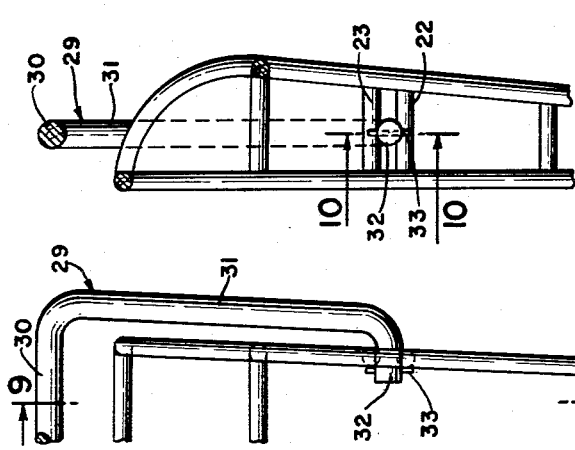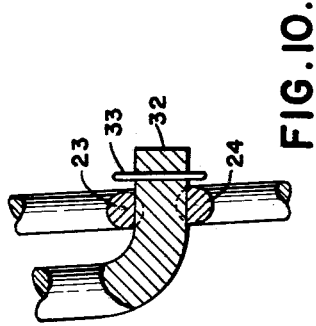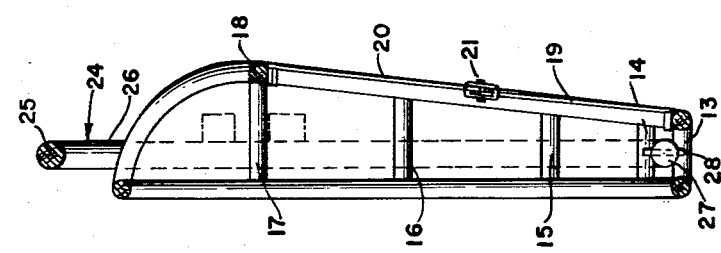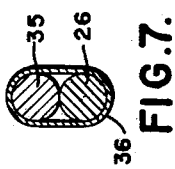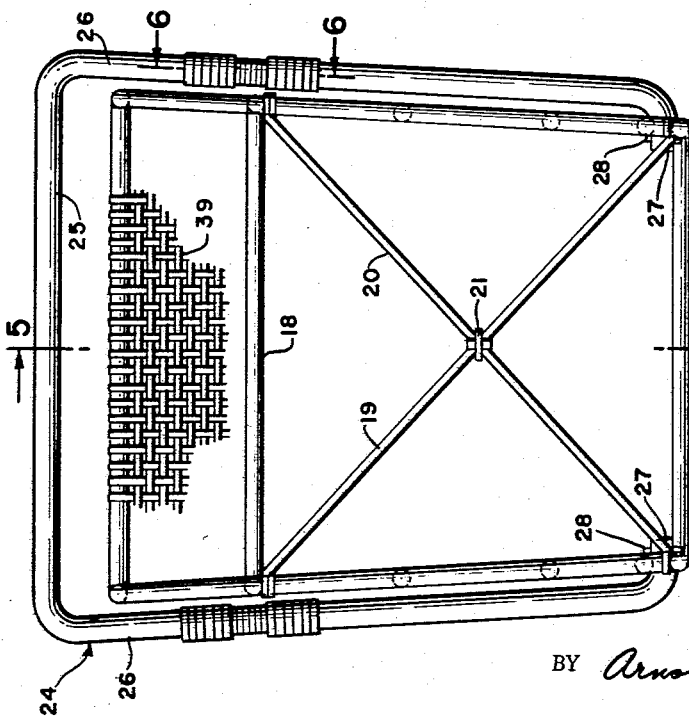

3,092,224
COMBINED CARRYING BAG AND SEAT
Brian D. O'Neil, 300 Pasco de la Playa,
Redondo Beach, Calif.
Filed May 24, 1962, Ser. No. 197,435
3 Claims. (Cl. 190—8)

This invention relates to hand-carried bags useful as a container for beach apparel and equipment, for example, and more particularly to an improved combination beach bag and seat.

Combination beach bags and seats have long been proposed, and such devices have achieved some limited success in the past. However, prior-art devices of this type have, in general, suffered from the disadvantage that, if made practical for use as a beach bag, the device was unsatisfactory for use as a seat and, if made practical as a seat, the device was not truly acceptable as a carrying bag.

A general object of this invention is to provide a combination beach bag and seat which is satisfactory for both of its intended purposes.

Another object is to devise a combination beach bag and seat which, while providing both strength and comfort when used as a seat, can be manufactured at unusually low cost.

A further object is to provide such a device which can be manufactured from rattan.

In order that the manner in which these and other objects of the invention are attained can be understood in detail, reference is had to the accompanying drawings, which form a part of this specification, and wherein:

FIG. 1 is a perspective view of a combined bag and seat, constructed in accordance with one embodiment of the invention, illustrating the same closed for carrying as a bag;

FIG. 2 is a perspective view showing the device of FIG. 1 opened, preparatory to being set up as a seat;

FIG. 3 is a perspective view showing the device of FIG. 1 set up as a seat;

FIG. 4 is an elevattional view of one half of the device of FIG. 1, with the covering largely omitted for clarity;

FIG. 5 is a sectional view taken on line 5—5, FIG. 4;

FIG. 6 is a fragmentary sectional view taken on line 6—6, FIG. 4.

FIG. 7 is a sectional view taken on line 7—7, FIG. 6;

FIG. 8 is an elevational view of a portion of the other half of the device of FIG. 1, with the covering omitted;

FIG. 9 is a sectional view taken on line 9—9, FIG. 8; and

FIG. 10 is a fragmentary sectional view taken on line 10—10, FIG. 9.

Referring now to the drawings in detail, the illustrated embodiment of the invention is a combination beach bag and seat comprising two hollow halves, indicated generally at 1 and 2, which are connected together by a loose hinge formed by closed loops 3.

The two halves are identical in overall configuration. Thus, as viewed in FIGS. 1–3, each half of the structure has two flat, spaced side walls 4, a base end wall 5 and an outer wall 6, the free edges 7 of the side walls, and free edges 8 and 9, respectively, of the base end and outer walls all being straight and arranged in a common plane to define a quadrilateral, walls 4 and 5 being at right angles to the common plane. Side walls 4 are identical, having outer edge portions 10 which are straight and diverge away from edges 7 as they extend away from the base end wall. Outer edge portions 10 join arcuate edge portions 11, the latter terminating at the respective corners formed by intersection of edge 8 with the two edges 7. Side walls 4 converge slightly toward base end wall 5.

Halves 1 and 2 of the device are constructed from rattan in any suitable fashion. Thus, for example, edge 9, edge portions 10 and 11, and the outer edge 12 of the base wall 5 can all be defined by a single, continuous piece of rattan suitably bent at the corners of the structure and along arcuate portions 11. Another continuous piece of rattan can be bent to U-shape so as to define edge 8 and both edges 7, the free ends of this piece being fixed respectively to the junctures of edge portions 11 with edge 9. Cross-frame elements 13–17 complete the framing for each side wall 4, in each side wall frame, elements 13 and 14 being closely spaced, and elements 13 also constituting portions of the frame of base end wall 5. A cross-frame member 18, extending transversely of structure 1, has its ends respectively joined to the junctures between arcuate edge portions 11 and edge portions 10. Two strips of rattan peel 19 and 20 extend diagonally across the quadrilateral defined by edge portions 10, cross member 18 and edge 12, strips 19 and 20 being tied at their ends to the frame structure. Additional rattan peel is employed, as indicated at 21, to tie strips 19 and 20 together at that point where the two strips cross each other.

The half of the structure indicated at 2 is constructed in the same fashion as is the half indicated at 1, save that strips 19 and 20 are omitted and, in each side wall, two cross-frame elements 22, 23 are provided at a location mid-way between the base end wall and edge 9, elements 22 and 23 being closely spaced and extending at right angles to the plane defined by edges 7, 8 and 9.

A generally U-shaped handle 24, formed integrally from a single piece of rattan of somewhat larger diameter than that used for the frames of halves 1 and 2 of the structure, is provided for half 1. Handle 24 has a base 25, a pair of legs 26 which are materially longer than the space between edges 8 and 9, and a short, in-turned end portion 27 at the free end of each leg 26. At their mid-points, cross-frame elements 13 and 14 are arcuately notched, with the notch in element 13 facing that in element 14 and the walls of the two notches being spaced diametrical by a distance approximately equal to the diameter of end portions 27 of handle 24. In effect, the notches of each pair of elements 13, 14 coact to form a plain bearing to accommodate the corresponding one of handle end portions 27, as will be clear from FIGS. 4 and 5. Each end portion 27 projects inwardly beyond the corresponding elements 13, 14 and is retained, against withdrawal, by a cross pin 28 extending through and projecting laterally from the handle end portion 27.

Since end portions 27 are coaxial with each other, and since the retaining notches in the two pairs of cross-frame elements 13, 14 form openings having a common axis parallel to edges 8 and 9, the base 25 of handle 24 is parallel to edge 9, as will be clear from FIG. 4.

A second generally U-shaped handle 29 is provided for the half of the structure indicated at 2, handle 29 being formed integrally from a single piece of rattan and comprising a base 30, a pair of legs 31, and a short in-turned end portion 32 at the free end of each leg 31. Each pair of cross-frame elements 22, 23 are arcuately notched at their mid-points in the same manner described with reference to elements 13, 14, end portions 32 each projecting inwardly through a different pair of the opposed notches so afforded. Cross pins 33 prevent withdrawal of end portions 32, as best seen in FIG. 10. Legs 31 of handle 29 are slightly more than half as long as legs 26 of handle 24.

Each leg 26 of handle 24 is provided with a catch or detent structure indicated generally at 34 and shown in detail in FIGS. 6 and 7. Each catch 34 includes two short pieces 35 of rattan secured to the corresponding leg 26 in coaxially spaced, end-to-end relation, as by rattan peel winding 36, so that opposed end faces 37 of the pieces 35 coact with a surface portion 38 of the handle leg to define a generally U-shaped notch. The two catches 34 are aligned transversely across half 1 of the structure, with both notches opening in the same direction, i.e., away from handle 29 when the two handles are disposed with their base portions 25 and 30 side-by-side, as seen in FIG. 1. In this embodiment, catches 34 are spaced from base 25 of the handle 24 by about one quarter of the length of legs 26. It will be noted from FIG. 4 that legs 26 converge as they extend away from base 25. Hence, the spacing between the two catches 34 is less than the length of bases 25 and 30.

Both halves 1 and 2 are completely covered with interwoven rattan peel, indicated at 39, FIG. 1, which is laced to the framework.

Since halves 1 and 2 are of identical configuration, and since free edges 7, 8 and 9 of each half lie in a common plane, the two halves can be arranged in mating positions, seen in FIG. 1, with the edges 7, 8 and 9 of one half respectively engaging edges 7, 8 and 9 of the other half. Loops 3 hold the two halves together at base end walls 5. A suitable loop- and pin-closure 40, FIG. 1, is provided to hold edges 9 together. Handles 24 and 29 are adjusted pivotally to bring their base portions 25 and 30 together. With the parts thus arranged, the device is effective as a closed beach bag conveniently carried by grasping the base portions of the two handles.

The bag can be opened by resting base end walls 5 on the ground, disengaging closure 40, and pivoting the two halves 1 and 2 away from each other until the convex surfaces of outer walls 6 rest on the ground, as seen in FIG. 2.

For conversion to a seat, the structure is turned so that, with the halves 1 and 2 open as in FIG. 2, one set of side walls 4 face the ground. Handle 24 is then swung, away from the half 1 and toward the open mouth of half 2, until handle 24 extends across the open mouth of half 2. The structure is then further turned to bring the free edges 7, 8 and 9 of half 1 against the ground, handle 24 now extending along the ground away from base end wall 5 of half 1, as seen in FIG. 3. With the parts in this position, catches 34 open upwardly. Half 2 is now pivoted upwardly, and handle 29 is swung to the position seen in FIG. 3, with base 30 thereof engaged in catches 34. Thus, the end portion of surface 6 of half 2 is held by loops 3 adjacent end wall 5 of half 1, and half 2 is braced in its upwardly and rearwardly slanting position, to serve as the back rest of the seat, by coaction of handle 29 and catches 34. Half 1 presents its convex surface upwardly, so as to give greatest comfort as a seat, and half 2 presents its convex surface forwardly, to give greatest comfort as a back rest. While constituting a loose hinge, loops 3 are adequate to hold half 2 in engagement with half 1, and the seat structure is thus adequately stable.

Crossed strips 19, 20 and cross-member 18 give extra support to the woven rattan covering which constitutes wall 6 so that, in view of the strength and resiliency of the framework, half 1 is capable of withstanding the weight of the user. It will be noted that cross-member 18 is located immediately below the rattan covering at the highest point of the convex seat, so assuring that the seat will maintain its convex form in use.

A flexible sheet 41 of cloth, synthetic resin, or other suitable material extends across that portion of the open mouth of half 2 disposed between end wall 5 and the two cross-frame elements 22, the edges of sheet 41 being laced or otherwise secured to edge 8 and the corresponding portions of edges 7 of half 2. As seen in FIGS. 2 and 3, sheet 41 coacts with wall 5 and the adjacent portions of walls 4 and 6 of half 2 to define a pocket, opening toward edge 9, for retaining small articles both when the device is used as a bag (FIG. 1) and when the device is used as a seat (FIG. 3).

Though it is advantageous to employ rattan for the framework of the device, and interwoven strips of rattan peel for the covering, it will be understood by those skilled in the art that other materials are suitable. Thus, the framework can be made of metal and the covering of sailcloth or other fabric, for example. A primary requisite in the choice of materials is that the framework and covering must provide adequate strength to support the weight of the user when the halves of the structure are disposed with their convex surfaces facing upwardly and forwardly as seen in FIG. 3. In this regard, it will be understood that the shape of the halves 1 and 2, and their manner of disposition in the two positions of use, constitute important features of the invention.

While one preferred embodiment of the invention has been chosen for illustrative purposes, it will be understood that various changes and modifications can be made therein without departing from the scope of the invention, as defined in the appended claims.

What is claimed is:
1. In a combined carrying receptacle and seat, the combination of
    first and second hollow structures each having a pair of spaced side walls joined by wall means extending transversely therebetween and forming a generally convex outer surface,
        said side walls and wall means of each of said structures having free edges which join to define the open mouth of the hollow structure,
        said first and second structures being of such size and shape that the free edges of one can be placed respectively in contact with the free edges of the other so that the two structures coact to form a closed receptacle for carrying articles;
    hinge means connecting said first and second structures together for pivotal movement relative to each other generally about an axis parallel to like free edges of said structures and at right angles to said side walls;
    a first generally U-shaped handle including a base and a pair of legs of equal length,
        the legs of said first handle being each pivoted to a different side wall of said first structure adjacent said hinge means and being of such length as to be capable of extending along beside the side walls of said first structure to maintain said base in a position spaced outwardly from the edge of said first structure opposite said hinge means;
    a second generally U-shaped handle including a base and a pair of legs of equal length,
        the legs of said second handle being each pivoted to a different side wall of said second structure at a point spaced from said hinge means toward the edge of said second structure opposite said hinge means,
        the legs of said second handle being substantially shorter than the legs of said first handle and the relative lengths of the legs of said handles and the locations of their respective pivotal connections to said first and second structures being such that, when the free edges of said first and second structures are in contact, said handles can be pivoted to bring the bases thereof together so that both bases can be grasped for carrying the device as a closed receptacle;
        the legs of said first handle and the legs of said second handle both being spaced apart by a distance greater than the width of said hollow structures, whereby both of said handles can be pivoted freely relative to said hollow structures; and catch means on each of said legs of said first handle forming a pair of notches which open away from the legs of said second handle when the bases of said handles are disposed together, said notches being spaced equally from the base of said first handle and spaced apart by a distance less than the length of the base of said second handle, said first and second structures and said handles being adjustable to form a seat by first pivoting said structures away from each other, then pivoting said first handle until its legs extend past said hinge means and adjacent said second structure, then placing the free edges of said first structure upon the supporting surface, and then further pivoting said first and second structures relative to each other until said second handle can be disposed with its base engaged in said catch means, said first structure then constituting a seat with its convex surface facing upwardly and said second structure being braced in upwardly and rearwardly slanting position by said second handle to constitute a backrest with its convex surface facing upwardly and forwardly.

2. A device in accordance with claim 1 and wherein said free edges of each of said hollow structures are straight and disposed in a common plane and said wall means of each of said structures includes a flat base end wall extending at right angles to the common plane of the corresponding set of said free edges.

3. In a combined carrying receptacle and seat, the combination of first and second hollow structures each comprising a pair of spaced side walls, each of said side walls having a straight, elongated, bottom edge, a straight short end edge extending at right angles to said bottom edge, and a top edge including a straight line portion commencing at said end edge and diverging away from said bottom edge, and an arcuate portion interconnecting the corresponding ends of said straight portion and said bottom edge, a flat, base end wall extending between said straight end edges of said side walls, and an outer wall bridging the space between said side walls and extending from said base end wall to the opposite ends of said bottom edges of said side walls;

said first and second hollow structures being of the same size and configuration so that the free edges of said side walls, said base end wall and said outer wall of one of said structures can be engaged with the corresponding free edges of the other of said structures, whereupon said first and second structures cooperate to form a closed receptacle for carrying articles;

hinge means connecting said first and second structures together at said base end walls for pivotal movement relative to each other generally about an axis parallel to said base end walls;

a first generally U-shaped handle including a base and a pair of legs of equal length, the legs of said first handle being each pivoted at its end to said first structure at a different end of said base end wall of said first structure and being of such length as to be capable of extending along outside of the adjacent one of said side walls of said first structure to position the base of said first handle at a point spaced outwardly from the end of said side walls opposite said base end wall;

a second generally U-shaped handle including a base and a pair of legs of equal length, the legs of said second handle being each pivoted to a different side wall of said second structure at a point intermediate of the length of such side wall, the legs of said second handle being substantially shorter than the legs of said first handle and the relative length of the legs of said handles and locations of their respective pivotal connections to said first and second structures being such that, when said structures are engaged with each other to constitute a receptacle, said handles can be pivoted to bring the bases thereof together so that both bases can be grasped for carrying the device as a closed receptacle;

said first and second generally U-shaped handles being located outside of said hollow structures so as to be freely pivotable relative thereto; and catch means on each of the legs of said first handle, said catch means forming a pair of notches centered on a line extending parallel to the base of said first handle and opening away from the legs of said second handle when the bases of said handles are disposed together, said notches being spaced apart by a distance less than the length of the base of said second handle, said first and second structures and said handles being adjustable to form a seat by first pivoting said structures away from each other, then pivoting said first handle until its legs extend past said hinge means and adjacent said second structure, then placing said first structure on the supporting surface with said outer wall facing upwardly, and then further pivoting said first and second structures relative to each other until said second handle can be disposed with its base engaged in said catch means, said first structure then constituting a seat and said second structure being braced by said second handle to constitute a back rest.

References Cited in the file of this patent

UNITED STATES PATENTS

| | | |
|---|---|---|
| D. 167,514 | Hicks | Aug. 19, 1952 |
| 2,571,139 | Johnson | Oct. 16, 1951 |
| 2,663,029 | Whitley et al. | Dec. 22, 1953 |
| 2,728,376 | Halde | Dec. 27, 1955 |
| 2,896,695 | Asheworth | July 28, 1959 |
| 2,915,154 | Holder | Dec. 1, 1959 |
| 3,018,132 | Baker et al. | Jan. 23, 1962 |